(12) United States Patent
Svarz et al.

(10) Patent No.: US 7,504,478 B2
(45) Date of Patent: Mar. 17, 2009

(54) ADDITIVES FOR INCREASING THE SEPARATION YIELD OF TALL OIL SOAP FROM BLACK LIQUORS

(75) Inventors: James J. Svarz, Naperville, IL (US); Prasad Y. Duggirala, Naperville, IL (US); Grady E. Worley, Hilton Head Island, SC (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/627,607

(22) Filed: Jan. 26, 2007

(65) Prior Publication Data

US 2008/0182967 A1 Jul. 31, 2008

(51) Int. Cl.
*C11B 13/00* (2006.01)
(52) U.S. Cl. ...................................... 530/205
(58) Field of Classification Search .................. 530/205
See application file for complete search history.

(56) References Cited

U.S. PATENT DOCUMENTS

| | | | | |
|---|---|---|---|---|
| 2,610,966 A | * | 9/1952 | Esposito | 530/232 |
| 3,890,295 A | * | 6/1975 | Lieberman et al. | 530/205 |
| 4,085,000 A | * | 4/1978 | Otrhalek et al. | 530/205 |
| 4,879,369 A | * | 11/1989 | Force | 530/205 |
| 5,250,152 A | * | 10/1993 | Ling et al. | 162/72 |
| 5,298,120 A | * | 3/1994 | Blackstone | 162/76 |
| 5,773,590 A | * | 6/1998 | Hart | 530/500 |
| 5,871,663 A | * | 2/1999 | Turner | 252/175 |
| 6,153,577 A | * | 11/2000 | Cripe et al. | 510/356 |
| 7,081,183 B2 | * | 7/2006 | Duggirala et al. | 162/72 |
| 2003/0139317 A1 | * | 7/2003 | Behler et al. | 510/421 |
| 2004/0016526 A1 | * | 1/2004 | Duggirala et al. | 162/72 |

* cited by examiner

*Primary Examiner*—Mark Eashoo
*Assistant Examiner*—Liam J Heincer
(74) *Attorney, Agent, or Firm*—Michael B. Martin; Benjamin E. Carlsen

(57) ABSTRACT

Methods of increasing the yield of tall oil soap from a black liquor are provided. In an embodiment, the method comprises adding a separation aid to the black liquor. The separation aid comprises alkyl alcohol alkoxylates of formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal.

20 Claims, No Drawings

ADDITIVES FOR INCREASING THE SEPARATION YIELD OF TALL OIL SOAP FROM BLACK LIQUORS

BACKGROUND

The present disclosure relates generally to the chemical processing of wood pulps. More specifically, the present disclosure relates to the use of separation aids in black liquor recovery processes.

The alkaline pulping of wood during the Kraft process yields wood pulp in addition to various recoverable naval stores including turpentines and tall oil soap. Recovery of tall oil soap from the spent pulping liquor is an important unit operation in the pulping process because the tall oil soap is a sellable feedstock that is further processed and fractionated into tall oil fatty acids, resin acids and phytosterols.

Tall oil fatty acids are useful in a myriad of chemical applications as a fatty acid source and upon further derivatization yields surfactants, alkyd resins and polyamide resins useful in numerous applications including cosmetics, printing inks and surface coatings. Importantly, phytosterols are a natural source of various precursor steroidal compounds (e.g. β-sitosterol) useful in pharmaceutical applications including the treatment of cardiovascular disease and its underlying conditions, lipid metabolism and cancers.

In addition to value as a chemical feedstock, the tall oil soap, if not managed properly can cause operational issues within the Kraft recovery process and subsequent papermaking processes. Some these operational issues may include evaporator fouling, evaporator scaling, pitch formation, bleach chemical demand, paper machine foaming, recovery furnace blackouts, wastewater treatment plant performance and rosin acid soaps accounting for 80% of plant effluent toxicity.

SUMMARY

The present disclosure relates to methods for increasing the yield of tall oil soap from a black liquor. In an embodiment, the method comprises adding one or more separation aids to the black liquor. The separation aid comprises one or more alkyl alcohol alkoxylates of the formula $RO[(CH_2CHCH_3O)_x(CH_2CH_2O)_y]M$ and combinations thereof. R is straight or branched alkyl of about 8 to about 22 carbon atoms; x is 1 to about 20; y is about 20 to about 80 and M is H or an alkali metal. Addition of the separation aid increases the separation yield of the tall oil soap from the black liquor. The tall oil soap can then be separated from the black liquor using any suitable processes.

In an embodiment, M is H.

In an embodiment, M is K.

In an embodiment R is straight or branched alkyl of about 16 carbon atoms.

In an embodiment, the alkyl alcohol alkoxylate is a block polymer.

In an embodiment, the concentration of the separation aid in the black liquor ranges from about 0.25 ppm to about 250 ppm.

In an embodiment, the concentration of the separation aid in the black liquor ranges from about 1.5 ppm to about 35 ppm.

In an embodiment, the separation aid is added to the black liquor as a component of an aqueous solution.

In an embodiment the separating is done by a soap skimmer.

In another embodiment, the present disclosure provides a method of increasing the yield of tall oil fatty acids from a black liquor. The method comprises adding a separation aid to a black liquor. The separation aid comprises one or more alkyl alcohol alkoxylates of the formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal. The method further comprises separating the tall oil soap from the black liquor and refining the tall oil soap into tall oil fatty acids.

In an embodiment, the refining is performed by a process such as, for example, acidification, fractionation, distillation and combinations thereof.

In an alternative embodiment, the present disclosure provides a method of generating tall oil fatty acids. The method comprises heating wood chips in a cooking liquor comprising sodium hydroxide and sodium sulfide to form the black liquor comprising wood pulp and separating the wood pulp from the black liquor. One or more separation aids are added to the black liquor. The separation aid comprises one or more alkyl alcohol alkoxylates of the formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal. The tall oil soap is separated from the black liquor and refined into tall oil fatty acids.

An advantage of the present disclosure is to provide a method for increasing the separation yield of tall oil soap from black liquor.

Another advantage of the present disclosure is to provide an improved method for increasing the recovery of tall oil soap.

Still another advantage of the present disclosure is to provide an improved method for generating tall oil fatty acids.

Additional features and advantages are described herein, and will be apparent from, the following Detailed Description.

DETAILED DESCRIPTION

The present disclosure relates to increasing the production of by-products from wood pulping processes. More specifically, the present disclosure relates to methods for increasing the yield of tall oil soap from a black liquor.

As used herein, the term "black liquor" means a spent pulping liquor derived from wood chips that have been subjected to the Kraft process as understood by the skilled artisan. For example, the black liquor is typically separated during drum washing of a wood pulp stream after it has undergone digestion in the Kraft process.

As used herein, the term "alkyl alcohol" means a compound or mixture of compounds of formula ROH where R is a straight or branched $C_8$—$C_{22}$ alkyl group.

As used herein, the term "hydroxide base" means the hydroxide (OH) salts of alkali metals such as sodium, potassium, calcium, magnesium lithium, and the like.

As used herein, the term "white liquor" means an aqueous mixture of alkali metal hydroxide and a sulfide with or without further additives and in concentrations well known in the art.

The Kappa number, which is directly proportional to the amount of lignin remaining in the pulp, is the volume (in milliliters) of 0.1 N potassium permanganate solution consumed by one gram of moisture-free pulp under the conditions specified in TAPPI method T 236 cm-85.

In a general pulping process, delignification is the primary reaction that allows wood fibers to be separated from one another. Various mechanical and chemical methods are used to cause this separation, but the most widely used technique is known as Kraft process, which produces pulp that gives high strength and good aging properties to paper products.

In the Kraft process, a cooking liquor (e.g. white liquor) of sodium hydroxide and/or sodium sulfide is used to extract the lignin from wood (e.g. in the form of wood chips). The process of extraction or delignification is carried out in digesters, either batch or continuous. The pH in the digester is generally between about 11 and about 14.

The liquor temperature in the digester is maintained between about 150 to about 175° C. A period of from about 2 to about 6 hours is usually required for complete digestion. Cooking liquor penetration of wood chips is vital to the success of the pulping process. Pulp uniformity correlates directly with the ease of paper manufacturing operations and quality of end products. Adequate movement of cooking liquor into the wood is an essential first step in the pulping process. Removal of sufficient lignin for fiber liberation requires the penetration and diffusion of black liquor into the chip and then uniform distribution throughout the wood.

Digestion and deresination can be considered to occur in the following manner: 1) wetting of wood chips and resin by an aqueous alkaline fluid; 2) penetration of the wood chips by this fluid; 3) break-up resin and fatty acid aggregates and defibering of the wood chips promoted by invasion of aqueous alkaline fluid into the chip flow channels; and 4) stabilizing dispersed resin particles thus reducing their redeposition onto cellulose fibers.

Surfactants can aid the above steps of the process through different mechanisms such as wetting, emulsifying, and dispersing these resinous materials into and out of wood structure. This results in a lower pulp resin content after cooking and washing stages. For dissolving grade pulps, it may be necessary to reduce the pulp resin content to very low levels to prevent adverse effects of resin on acetate and viscose properties. In papermaking pulps, these extractives, when liberated during the processing of the wood chips to pulp and paper products, can cause troublesome pitch deposits on mill equipment, press picking and off quality production. Hence, effective pulp deresination aids can be useful in the manufacture of paper pulps as well as dissolving pulps in both batch and continuous processes including the KAMYR process.

After the digestion step, the cooking liquor containing the wood chips is transferred into a blow tank. In the blow tank, the wood chips fall apart into individual fibers (e.g. pulp) to form a pulp stream. The temperature of the blow tank is operated at approximately 95° C. to 110° C.

From the blow tanks, the pulp from the pulp stream is washed, for example, in a rotary vacuum drum washer to separate the processed wood pulp from the liquid carrier stream. This washing/separation of the pulp produces a black liquor (i.e. spent pulping liquor). The wood pulp can receive further treatment such as bleaching prior to manufacture of paper products.

The black liquor can be subjected to an evaporation process to concentrate it. The black liquor can be further treated according to various embodiments of the present disclosure.

In an embodiment, the method comprises adding one or more separation aids to the black liquor. The separation aid comprises one or more alkyl alcohol alkoxylates of the formula $RO[(CH_2CHCH_3O)_x(CH_2CH_2O)_y]M$ and combinations thereof. R is straight or branched alkyl of about 8 to about 22 carbon atoms; x is 1 to about 20; y is about 20 to about 80 and M is H or an alkali metal. It has been surprisingly found that addition of the separation aid increases the separation yield of the tall oil soap from the black liquor. For example, a greater amount of the tall oil soap will rise to the top of the black liquor with the addition of the separation aid. The tall oil soap can then be separated from the black liquor using any suitable process such as, for example, a soap skimmer.

It should be appreciated that any suitable amount of the separation aid can be added to the black liquor at any time. The separation aid can be added to the black liquor in any suitable form (e.g. solid, liquid) and with any additional components (e.g. part of an aqueous solution), for example, in the form of a mixture. Preferably, an amount of separation aid can be added so that the concentration of the separation aid in the black liquor ranges from about 0.25 ppm to about 250 ppm. More preferably the concentration of the separation aid in the black liquor ranges from about 1.5 ppm to about 35 ppm.

The black liquor typically contains 14 to 18 percent solids. The solids are approximately 65% organic, that originate from the wood, and 35% inorganic salts that come from the white cooking liquor. The solubilized wood components may be divided into a number of fractions: 1) ligneous materials (macromolecular colloid solubilized by ionized phenolic and carboxylic acid groups); 2) saccharinic acids (water soluble hydroxy acids; carbohydrate degradation products); 3) low molecular weight organic acids (acetic, formic, glycolic, lactic, etc.); and 4) extractives (fatty acids, rosin acids, and their esters, neutral fraction).

The extractives are the source of the soap that naturally separates from the black liquor. Black liquor soaps (i.e. tall oil soap) are burned for their heat value or recovered and further processed to yield crude tall oil (CTO), an important source of revenue to the mill. Black liquor soap naturally separates from black liquor at various points in the pulping process. The soap separates as a lamellar liquid crystalline phase. It is this phase separated material that may be observed floating in pulp washer vats, at the surface of filtrate and weak black liquor tanks, and in large amounts at the foam tower and black liquor soap skimmer. The black liquor soap skimmings can be collected from various locations and are pooled together in a central holding tank where the skimmings can be held prior to acidulation.

Black liquor soap skimmings generally comprise a mixture of fatty and rosin acid salts, (i.e., anionic surfactants), fatty and rosin acid esters, and neutral components. Black liquor soap skimmings, being a natural product, contain hundreds of different compounds. The predominance of a given constituent varies with tree species, pulping chemistry and genetic factors. The fatty acids are predominantly oleic and linoleic acids with small quantities of linolenic, stearic and palmitic acid. The rosin acids are mono-carboxylic diterpene acids having a general formula $C_{20}H_{30}O_2$. The predominant rosin acids are abietic and dehydroabietic acids, although numerous distinctive isomers occur. Both abietic and dehydroabietic acids contain three six-membered rings. Dehydroabietic acid contains one aromatic ring, and thus differs from abietic acid, which contains three unsaturated rings. The neutral fraction, often called unsaponifiables, is a mixture of a variety of substances including phytosterols, fatty and wax alcohols, terpenes and hydrocarbons.

The extractives in black liquor are partially solubilized and, as a result, black liquor is a colloidal system. The extractives may be in several different states in black liquor, including true solution, micellar solution, liquid crystalline phases and, eventually, neat soap. Most of these colloidal states occur simultaneously and are in a sort of equilibrium with one another. The aggregative state of the tall oil soap depends on the concentration of the dispersed soap as well as on the salt content and solids content of the liquor. Since the black liquor is typically concentrated in evaporators prior to combustion in the recovery furnace, the black liquor colloid is continually undergoing stresses. The stresses result from a continual increase in solids content as the water is evaporated from the black liquor. As the water is removed, the salt content of the liquor increases, causing a natural salting out of any organics present. The minimum solubility of soap has been reported to be at a black liquor solids content of between 22 and 28 percent. Other factors such as residual effective alkali, temperature and, possibly, the ratio of fatty acid to rosin acid present in the liquor also can influence the solubility and, therefore, the tendency of the tall oil soap to phase separate.

The fatty acid and rosin acid salts form micelles that solubilize the neutral fraction of the extractives Micelle formation, which indicates the onset of phase separation, depends on a number of factors. These include salt content, fatty to rosin acid ratio and temperature. Generally, as the salt content increases, the concentration of soap at which micelles form decreases; i.e., the soap is less soluble. Mixed micelles, where the ratio of fatty to rosin acid soaps is between 1:1 and 2:1, are more stable than micelles of either singular soap. Micelle formation is independent of temperature between 20 and 80° C., but the soap becomes much more soluble at higher temperatures. There is a small amount of soap left in the black liquor that is present as individual soap monomers that are in true solution rather than micellar solution, or as soap monomers that are in equilibrium with micellar solution. This residual soap is difficult to remove and is generally still left in the black liquor after the soap skimmer. Although the soap particles (e.g. tall oil soap) that form in the black liquor separate naturally from solution, the addition of the separation aids in alternative embodiments of the present invention substantially increases the separation of tall oil soap from the black liquor.

In another embodiment the present disclosure provides a method of increasing the yield of tall oil fatty acids from a black liquor. The method comprises adding a separation aid to a black liquor. The separation aid comprises one or more alkyl alcohol alkoxylates of the formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal. The method further comprises separating the tall oil soap from the black liquor and refining the tall oil soap into tall oil fatty acids.

For example, the refining process can comprises acidifying the tall oil soap to yield crude tall oil. The crude tall oil can be further refined in any suitable separation process such as, for example, fractionation, distillation or combinations thereof to produce tall oil fatty acids that are useable in a variety of different applications.

In an alternative embodiment, the present disclosure provides a method of generating tall oil fatty acids. The method comprises heating wood chips in a cooking liquor comprising sodium hydroxide and sodium sulfide to form the black liquor comprising wood pulp and separating the wood pulp from the black liquor. One or more separation aids are added to the black liquor. The separation aid comprises one or more alkyl alcohol alkoxylates of formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal. The tall oil soap is separated from the black liquor and refined into tall oil fatty acids.

The alkyl alcohol alkoxylates of this disclosure comprise the formula $RO[(CH_2CHCH_3O)_x(CH_2CH_2O)_y]M$ wherein R is straight or branched alkyl of about 8 to about 22 carbon atoms; x is 1 to about 20; y is about 20 to about 80 and M is H or an alkali metal. The alkyl alcohol alkoxylates can be prepared by heating a $C_4$—$C_{40}$ alkyl alcohol, or mixture of $C_4$—$C_{40}$ alkyl alcohols, both designated herein as ROH, with propylene oxide, and optionally ethylene oxide in the presence of a hydroxide base. Preferably, the reaction is conducted at a temperature of about 150° C. in a pressure vessel at a pressure of about 50 to about 75 psi. The resulting alkoxylate may be either left in salt form or neutralized with acid.

The ethylene oxide and propylene oxide may be added in random or block fashion. As used herein, the term "block polymer" means the polymer resulting from block addition of the propylene oxide and ethylene oxide. As used herein, the term "hetero polymer" means the polymer resulting from random addition of the propylene oxide and ethylene oxide.

Random addition of ethylene oxide and propylene oxide involves both components being added to the alcohol simultaneously, such that the rate of addition to the alcohol is controlled by their relative amounts and reaction rates. Thus, in the case of random addition, it is understood the above formula is not a structural formula but rather is representative only of the molar amounts, x and y, of ethylene oxide and propylene oxide that are added to the alcohol ROH.

In the case of block addition, either the ethylene oxide or propylene oxide can be added first to the alcohol and allowed to react. The other component can then be added and allowed to react. In the case of block addition, the above formula is representative of the structure of the alkoxylated alcohol, except that the $(C_2H_4O)_x$ and $(C_3H_6O)_y$ groups may be reversed depending on whether the propylene oxide or ethylene oxide is added first. The resulting polymer is a highly water soluble solid.

In an embodiment, M is H or K. In another embodiment, R is straight or branched alkyl of about 8 to about 22 carbon atoms; x is 1 to about 20; y is about 20 to about 80 and M is H or an alkali metal. In an embodiment, the alkyl alcohol alkoxylate is a block polymer. In another embodiment, the alkyl alcohol alkoxylate is a hetero polymer.

Although the specific percentages and process parameters described herein are preferred, other percentages and parameters may be utilized.

By way of example and not limitation, the following are illustrative of various embodiments of the present invention.

EXAMPLE 1

A series of field trials using the separation aids is performed for a period of about a month. The impact of the separation aids in increasing the separation yield of tall oil soap from black liquor is evaluated using the following process conditions during the experimental trials.

TABLE 1

| DIGESTER PROPERTIES | |
|---|---|
| Sodium hydroxide conc. (active alkali) | 6.9 AA |
| Sodium sulfide concentration (sulfidity) | 28 |
| Amount of wood chips | 190 tph |
| Amount of white liquor | 673 gpm |
| Liquor to wood ratio | 20.8% AA |
| Wood species | Southern Pine |
| Cook time | 6 hrs |
| Cook temperature | 150° C.-180° C. |
| Cook pressure | 160 psi |

TABLE 1-continued

DIGESTER PROPERTIES

| | |
|---|---|
| Kappa number of finished pulp | 25 |
| Digester Yield | 48 |
| Black liquor solids at end of cook | 18.50% |

TABLE 2

RECOVERY PROPERTIES (POST DIGESTER)

| | |
|---|---|
| Liquor solids | 29.3% |
| Temperature | 190° F. |
| pH | 12 |
| Liquor flow to skimmer | 955 gpm |
| Liquor flow out of skimmer | 955 gpm |
| Liquor residence time in skimmer | 6 hr |
| Product dose and feedpoint description | 25 ppm |
| Ratio of Crude Tall Oil Soap (CTOS)/ 1000 lbs Black liquor solids (BLS) (Residuals to evaporators) | 28.5 |
| Ratio of CTOS/1000 lbs BLS (Skimmer outlet) | 14.4 |
| Ratio of CTOS/1000 BLS (w/chemical treatment outlet) | 6.4 |

Inspection of the trial data shows a large increase in yield of the tall oil soap derived from the black liquor (e.g. the amount collected from the skimming process) when the separation additive is added. The pre-trial (i.e. no separation aid added) value of tall oil soap is approximately 105 pounds of tall oil soap/per ton of pulp produced. During the trial using the separation aids, the yield increases to approximately 215 pounds of tall oil soap/per ton of pulp produced. As a result, the increase in yield of tall oil soap generated from the black liquor is approximately 100% or more over the amount of tall oil soap generated in the absence of the separation aids.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of recovering tall oil soap from a spent black liquor generated in the alkaline pulping of wood, the method comprising:
adding to the spent black liquor during a black liquor recovery process which occurs subsequent to a Kraft process a separation aid selected from the group consisting of alkyl alcohol alkoxylates of formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal; and
separating the tall oil soap from the spent black liquor.

2. The method of claim 1, wherein M is H.

3. The method of claim 1, wherein M is K.

4. The method of claim 1, wherein R is straight or branched alkyl of about 16 carbon atoms.

5. The method of claim 1, wherein the alkyl alcohol alkoxylate is a block polymer.

6. The method of claim 1, wherein the concentration of the separation aid in the spent black liquor ranges from about 0.25 ppm to about 250 ppm.

7. The method of claim 1, wherein the concentration of the separation aid in the spent black liquor ranges from about 1.5 ppm to about 35 ppm.

8. The method of claim 1, wherein the separation aid is added to the spent black liquor as a component of an aqueous solution.

9. The method of claim 1, wherein the separating is done by a soap skimmer.

10. A method of generating tall oil fatty acids from a spent black liquor generated in the alkaline pulping of wood, the method comprising:
adding to the spent black liquor during a black liquor recovery process which occurs subsequent to a Kraft process a separation aid selected from the group consisting of alkyl alcohol alkoxylates of formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal;
separating the tall oil soap from the spent black liquor; and
refining the tall oil soap into tall oil fatty acids.

11. The method of claim 10, wherein M is H.

12. The method of claim 10, wherein M is K.

13. The method of claim 10, wherein R is straight or branched alkyl of about 16 carbon atoms.

14. The method of claim 10, wherein the alkyl alcohol alkoxylate is a block polymer.

15. The method of claim 10, wherein the concentration of the separation aid in the spent black liquor ranges from about 0.25 ppm to about 250 ppm.

16. The method of claim 10, wherein the concentration of the separation aid in the spent black liquor ranges from about 1.5 ppm to about 35 ppm.

17. The method of claim 10, wherein the separating is performed by a soap skimmer.

18. The method of claim 10, wherein the refining is performed by a process selected from the group consisting of acidification, fractionation, distillation and combinations thereof.

19. A method of generating tall oil fatty acids, the method comprising:
heating wood chips in a cooking liquor comprising sodium hydroxide and sodium sulfide to form a black liquor comprising wood pulp;
separating the wood pulp from the black liquor to form a spent black liquor;
adding to the spent black liquor during a black liquor recovery process which occurs subsequent to a Kraft process a separation aid selected from the group consisting of alkyl alcohol alkoxylates of formula $RO[(CH_2CHCH_3O)_x(CH_2CH_2O)_y]M$ and combinations thereof, wherein R is straight or branched alkyl of about 8 to about 22 carbon atoms; x is 1 to about 20; y is about 20 to about 80 and M is H or an alkali metal;
separating the tall oil soap from the spent black liquor; and
refining the tall oil soap into tall oil fatty acids.

20. The method of claim 19, wherein the refining is performed by a process selected from the group consisting of acidification, fractionation, distillation and combinations thereof.

* * * * *